Dec. 24, 1940. C. D. NIVEN Re. 21,674

HEATING SYSTEM FOR REFRIGERATOR CARS

Original Filed June 26, 1935 2 Sheets-Sheet 1

INVENTOR:
CHARLES DAVID NIVEN
By Alex. E. MacRae
Attorney

HEATING SYSTEM FOR REFRIGERATOR CARS

Original Filed June 26, 1935 2 Sheets-Sheet 2

INVENTOR:
CHARLES DAVID NIVEN
By Alex. E. MacRae
Attorney

Reissued Dec. 24, 1940

Re. 21,674

UNITED STATES PATENT OFFICE 21,674

HEATING SYSTEM FOR REFRIGERATOR CARS

Charles David Niven, Ottawa, Ontario, Canada, assignor to The Honorary Advisory Council for Scientific and Industrial Research, Ottawa, Ontario, Canada, a corporation of Canada Original No. 2,076,961, dated April 13, 1937, Serial No. 28,588, June 26, 1935. Application for reissue November 16, 1938, Serial No. 240,748

16 Claims. (Cl. 237—35)

This invention relates to a heating system for refrigerator cars and has for an object to provide a system which may be installed, as a permanent and self-contained unit, on cars at present in use.

It is usual at the present time to place small heaters in the ice bunkers of refrigerator cars during cold weather. Such heaters cannot be permanently installed and moreover, they have the disadvantage that the hot air rising therefrom collects near the top of the car, which results in an uneven heat distribution, the lower part of the car being too cold and the upper part too hot. Moreover, such heaters emit carbon monoxide fumes which render the atmosphere inside the car dangerous to workmen.

It has been proposed to employ heaters using a liquid circulation system as a permanent unit on cars but such heaters heretofore have been of designs which either interfere with the loading space of the car or employ some mechanical method of forced circulation, which cannot be installed conveniently on cars at present in use.

The object of the present invention is thus to provide a heating system which eliminates these and other disadvantages and which includes a heater which is self-feeding and readily controllable.

Further objects and advantages will appear from the following description with reference to the accompanying drawings, in which, Figure 1 is a diagrammatic top plan of a refrigerator car, with parts removed, showing heating system installed therein.

Figure 1:
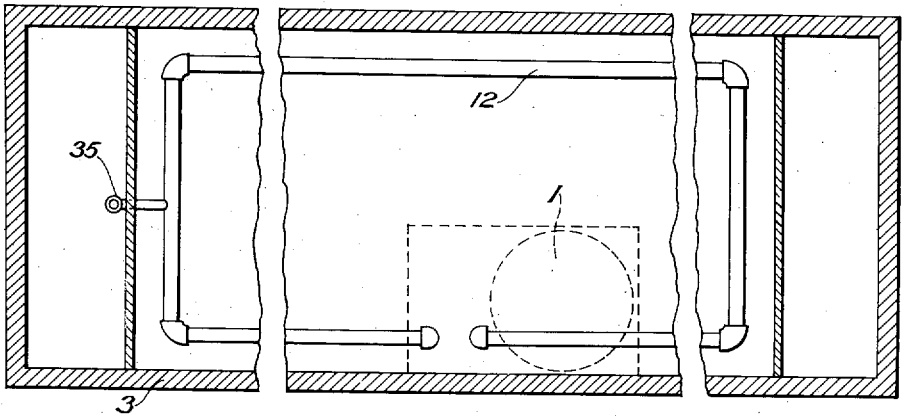
Figure 2:
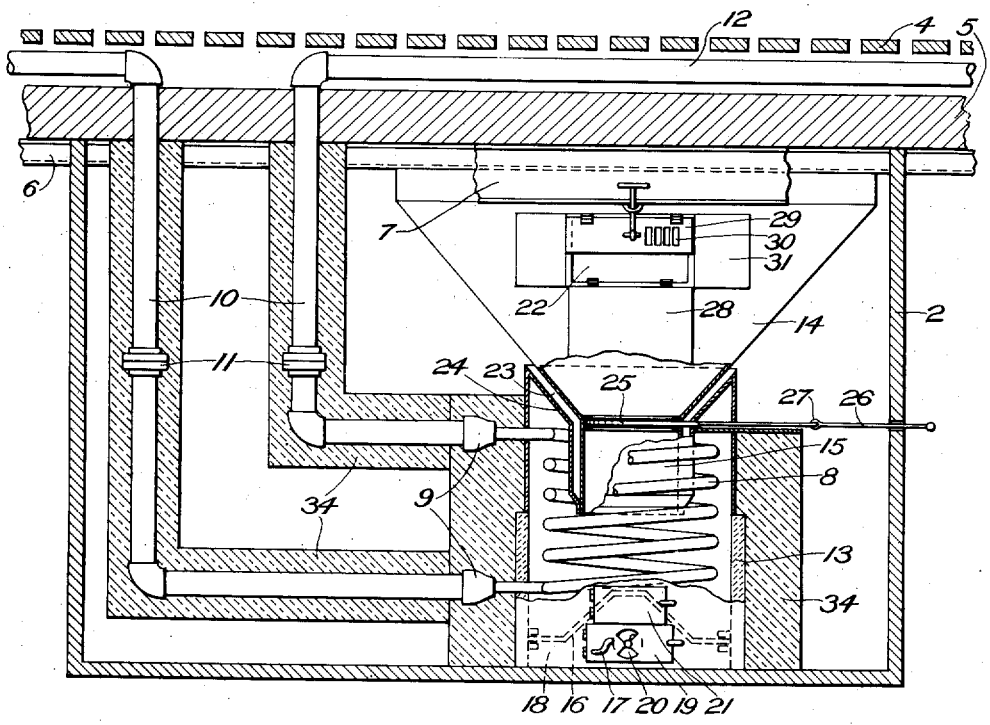
Figure 2 is a sectional side elevation of pertinent portions of the heating system.
Figure 3:
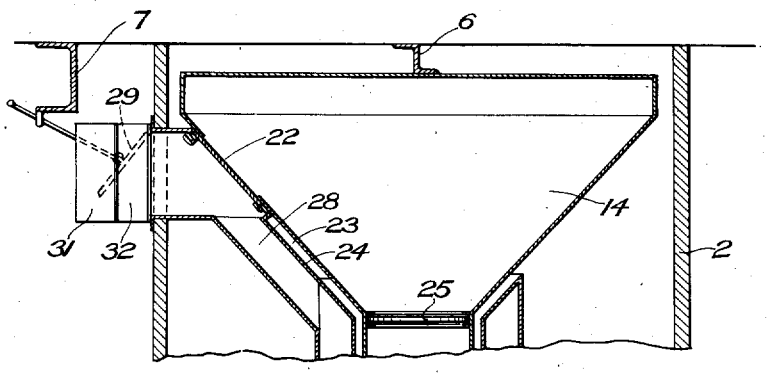
Figure 3 is a sectional end elevation of the heater hopper.
Figure 4:
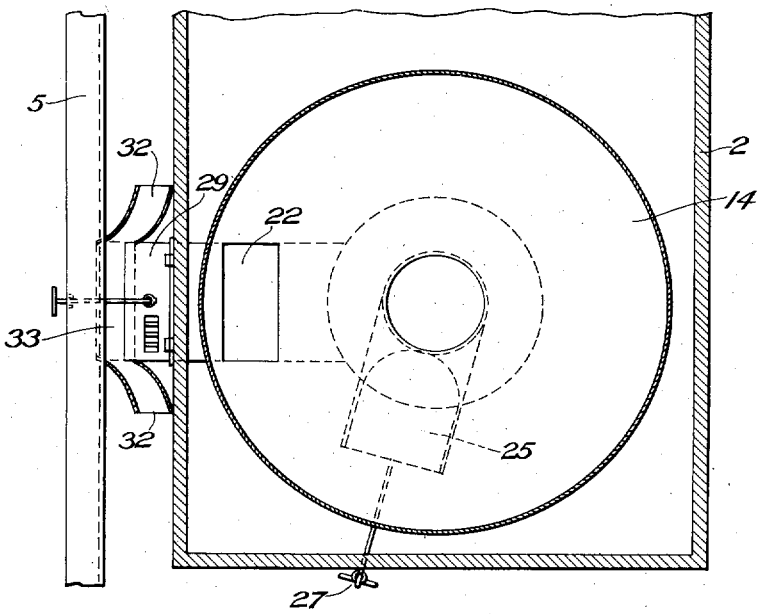
Figure 4 is a top plan of the heater hopper.

In the drawings, 1 indicates the heater which is suitably supported within a housing 2 underneath a refrigerator car 3 provided with the usual floor rack 4, floor 5, Z-bar 6 and steel sill 7. A suitable liquid circulation means, which, for instance, may comprise a coil 8, is placed inside the heater, the ends of the coil being joined by means of connections 9 to riser and return pipes 10 which may be provided with couplings 11 and which lead upwardly through the floor of the car to a heating or radiating coil 12 which extends around the floor of the car underneath the rack 4 as shown. The heater is provided with a firepot 13 and a fueling hopper 14 which is formed with a neck 15 extending down into the firepot. The fuel hopper 14 preferably projects upwardly between the sills 7 to provide a heater of greater vertical depth without extending too close to the rail line and at the same time providing a hopper of large fuel capacity. The heater also includes a grate 16, which may, for instance, be of the conical type, as shown a shaker handle 17 for shaking the grate, an ash pit 18, an ash pit door 19 with a draught control 20, and an inspection door 21 communicating with the fire box.

The hopper 14 is loaded with fuel through a door 22 below the sill 7 and accessible from outside of the car and the lower portion of the hopper and neck 15 extend within the combustion chamber and are insulated by the provision of a surrounding space 23 formed by means of an outer casing 24. The space 23 is for the purpose of protecting the fuel supply in the hopper from hot combustion gases and is shown as an air space but obviously any suitable insulating method may be adapted for the purpose. A fuel cut-off door 25 may be provided in the hopper together with an operating handle 26 therefor. The handle 26 may be formed with a knee joint 27 which allows the handle to fall down when open and thus prevents any possibility of the cut-off closing by the vibration of the train.

The waste combustion gases are led off by means of an outlet of flue 28 which is provided with a door 29 in which is formed a draught control 30. A cowl 31 is provided at the flue opening for the purpose of ensuring delivery of the gases when the car is in motion. It will be noted that air will enter either of two air suction passages 32 and emerge through the outer cowl opening 33 thus drawing with it the waste gases and providing a positive escape therefor.

In view of the fact that the hopper door 22 must fit tightly in order to prevent the entrance of air into the hopper and consequently the probable ignition of the fuel therein, ice, which forms by condensation of moisture driven off from the charcoal by the warmth from the firepot, would prevent the door 22 from being opened unless means are provided for preventing the condensed water from freezing. In the present instance this difficulty is overcome by leading the hot combustion gases over the door 22 as shown.

The exposed portions of the firepot 13 and pipes 10 should be insulated as indicated at 34. It is vital to the successful operation of this heating system that the fullest advantage be taken of the possible thermal head that can be developed in the limited head room available below the floor of the car. This is accomplished as shown by thermal insulation 34 in adequate amount exteriorly of all parts of the heater adjacent to liquid containing parts and also of connecting pipes, particularly of the riser pipe. The cooling of heated liquid in the riser pipe by the outside moving air has been found by trial to destroy a large part of the thermal head and to actually stop and even reverse the circulation. Thermal insulation thus serves primarily to develop and conserve thermal head for circulation and secondarily to prevent undue heat losses and consequent waste of fuel. No forced or mechanical circulation or impracticable height of heater is required to maintain the flow of heating medium.

An expansion means of usual type for the circulation system may be provided as indicated at 35.

In operation, the hopper 14 is charged with a suitable fuel and a liquid placed in the circulation system which includes the coil 8, pipes 10 and coil 12. It has been found that charcoal is a preferable fuel and that an anti-freeze solution is particularly suitable for employment as the circulating liquid in order to avoid the possibility of freezing during cold weather. The hopper 14 and neck 15 form a magazine for self-feeding the charcoal to the firepot below, the ash passing through the movable grate to the ash pit. The hot gases pass up and around the coil 8, thus heating the liquid therein and causing a circulation thereof through the pipes 10. The heating coil 12 being located under the floor rack 4 and thus utilizing normally waste space, no encroachment on the loading space or icing compartments of the car is made. Moreover the disposition of the heating medium adjacent the bottom portion of the car ensures that all the heat entering the car is supplied from below, thus creating the ideal conditions necessary to obtain an even heat throughout the loading space.

The method of disposing of the combustion gases closely adjacent the heater by means of the cowl 31 is particularly convenient since the encroachment on useful space in or about the car is thereby avoided.

The hopper 14 is of substantial capacity and requires infrequent refuelling. By suitably arranging the outlet and inlet draught controls the fire may be readily controlled and the necessity of constantly lighting and extinguishing the fire, as is usually the case with heaters at present in use, is largely overcome.

The location of the heater underneath the car enables it to be conveniently attended to in contrast with present practice.

Should it be necessary to clean out the firepot, it is only necessary to close the door 25 and remove the contents of the firepot through door 21, thus avoiding the waste of fuel which occurs when the standard heater is "dumped" in order to extinguish it.

It will be understood that various embodiments of numerous details of the invention may be made without departing from the spirit of the invention as defined in the appended claims.

The accompanying drawings illustrate the preferred form of the invention, though it is to be understood that the invention is not limited to the exact details of construction shown and described, as it is obvious that various modifications thereof within the scope of the claims will occur to persons skilled in the art.

I claim:

1. In a heating system for refrigerator cars, a heater located entirely outside of and directly below the floor of the car, liquid heating means in the heater, liquid circulating pipes directly above the floor of the car, riser pipes connecting said liquid heating means and said liquid circulating pipes, means for preventing undesired reverse circulation of liquid due to the limited height of the heater and exposure to weather conditions comprising thermal insulation surrounding said riser pipes and said heater adjacent the liquid heating means, means for admitting fuel to the heater and a combustion gas discharge passage having its discharge opening located above the insulation surrounding the heater and directly below the floor of the car, said passage being adapted to supply heat to the fuel admitting means to prevent freezing of condensed moisture thereon.

2. In a heating system for refrigerator cars, a heater located entirely outside of and directly below the floor of the car, liquid heating means in the heater liquid circulating pipes directly above the floor of the car, riser pipes connecting said liquid heating means and said liquid circulating pipes, means for preventing undesired reverse circulation of liquid due to the limited height of the heater and exposure to weather conditions comprising thermal insulation surrounding said riser pipes and said heater adjacent the liquid heating means, a horizontal combustion gas discharge passage located above the insulation surrounding the heater and directly below the floor of the car, and a fuel charging door for the heater located within said discharge passage.

3. In a heating system for refrigerator cars, a heater located entirely outside of and directly below the floor of the car, said heater including a horizontal combustion gas discharge passage also located below the floor of the car, a firepot, a fuel feeding hopper having a neck communicating therewith, a fuel charging door located within said discharge passage and communicating with said hopper, and a casing surrounding said neck and lower portion of the hopper to provide an insulating space therefor, and a liquid circulating system including heating means therefor in said heater and a heating coil located directly above the floor of the car, and insulating means for said system adapted to prevent undesired reverse circulation of the liquid due to the limited height of the heater and exposure to weather conditions.

4. A heating system for a refrigerator car including a heater below and adjacent the floor of the car body, said heater comprising a firepot, a fuel feeding hopper above the firepot, and a combustion discharge flue communicating with said firepot, the upper part of said flue constituting a passage for charging said hopper.

5. A heating system for a refrigerator car including a heater below and adjacent the floor of the car body, said heater comprising a fuel hopper having a solid top and side walls converging toward an aperture communicating with a firepot, a housing surrounding said heater, a combustion gas discharge flue extending from said firepot and provided with an upper part adapted to discharge said gas outside of the housing, a door in a side wall of said hopper communicating with said upper part of the gas discharge flue, whereby said upper part may also be used to charge the hopper.

6. In a refrigerator car having spaced apart sills, a car body extending between and supported by said sills; a heater below the floor of the car body adjacent one of said sills, said heater comprising a fuel hopper having side walls converging downwardly toward an aperture communicating with a firepot, said heater having fueling means outside of the car body and below said last mentioned sill comprising an opening in the side of said hopper, a combustion gas discharge flue extending from said firepot and provided with an upper part below said last mentioned sill adapted to discharge said gas outside the car body substantially in the vertical plane of said last mentioned sill.

7. A heating system for a refrigerator car including a heater below and adjacent the floor of the car body, said heater comprising a firepot, a fuel feeding hopper above the firepot and extending thereinto, a liquid heating coil within the firepot communicating with liquid circulating pipes within the car body, a combustion discharge flue connected to said firepot with its discharge opening at a lower level than said floor, and a door providing access to charge said hopper, said discharge opening being so positioned that discharge gases flowing therethrough heat said door to prevent freezing of moisture thereon.

8. A heater comprising a firepot, a fuel feeding hopper above the firepot, a liquid heating coil within the firepot, a door for fueling the hopper from the side and a combustion discharge flue disposed below said door and having an opening positioned so that discharge gases flowing therefrom impinge upon said door to prevent freezing of moisture thereon.

9. In a railway refrigerator car having spaced apart sills supporting the car body, in combination with a heater suitably supported under the floor of the car body adjacent one of said sills, said heater including a fuel hopper which projects upwardly between said sills, liquid circulating means comprising a coil within the heater communicating with heat radiating pipes within the car body, and means for fueling said hopper from outside the car body at a lower level than said second mentioned sill.

10. A structure as defined in claim 9 wherein the said means for fueling the hopper also provides means to exhaust the gases of combustion from said heater outside of the car body.

11. A structure as defined in claim 9 wherein the said means for fueling the hopper is so positioned with respect to the means for discharging gases of combustion that the said means for fueling are warmed or heated by the said gases of combustion flowing from the heater.

12. In combination with a refrigerator car having a floor, a heater disposed below and adjacent said floor and comprising a firepot, a fuel feeding hopper overlying substantially all of the firepot and extending thereinto, a liquid heating coil within the firepot, a fuel charging door leading to said hopper, and a combustion discharge flue, constructed and arranged so that gases flowing in said discharge flue impinge upon said fuel charging door to retard condensation and freezing of moisture on and around said door.

13. In a refrigerator car having spaced apart sills, a car body having a floor disposed above and adjacent said sills and walls disposed substantially in the vertical planes of the sills, a heater below said floor adjacent one of said sills, said heater comprising a fuel hopper converging downwardly toward an aperture communicating with a firepot to provide gravity feed of fuel from said hopper to said firepot and a combustion gas discharge flue extending from said firepot and provided with an outer part below said last mentioned sill adapted to discharge said gas substantially in the vertical plane of said last mentioned sill.

14. A structure as defined in claim 13 including aspirator means adjacent said sill adapted to eject gases from said flue.

15. In a refrigerator car having a floor, a heater below and adjacent said floor, said heater comprising a firepot, a fuel feeding hopper thereabove, the lower part of said hopper extending within said firepot and the upper part of said hopper overlying the major part of the firepot and extending therebeyond to a width at least twice the width of the firepot, a liquid heating coil within said firepot, a liquid circulating pipe within said car, and means connecting said coil and said pipe.

16. A heater for a refrigerator car comprising a firepot, a fuel hopper above the firepot and extending therebeyond a substantial distance, a combustion discharge flue leading from the firepot, said flue being adjacent to and in contact with a wall of said hopper, and a door for charging said hopper, said flue being arranged so that gases flowing therethrough impinge upon said door to prevent freezing of moisture thereon.

C. D. NIVEN.